June 18, 1968          D. C. LEWIS          3,389,314
PROPORTIONAL SILICON CONTROLLED RECTIFIER
DRIVEN SYSTEM FOR A HEAT MOTOR
Filed May 7, 1962          2 Sheets-Sheet 1

TERMINAL VOLTAGE

TRIGGER CURRENT

HEATER CURRENT

TERMINAL VOLTAGE

TRIGGER CURRENT

HEATER CURRENT

INVENTOR.
DWIGHT C. LEWIS
BY *Hofgren, Brady,*
*Wegner, Allen & Stellman*
ATTYS.

June 18, 1968          D. C. LEWIS          3,389,314
PROPORTIONAL SILICON CONTROLLED RECTIFIER
DRIVEN SYSTEM FOR A HEAT MOTOR
Filed May 7, 1962          2 Sheets-Sheet 2
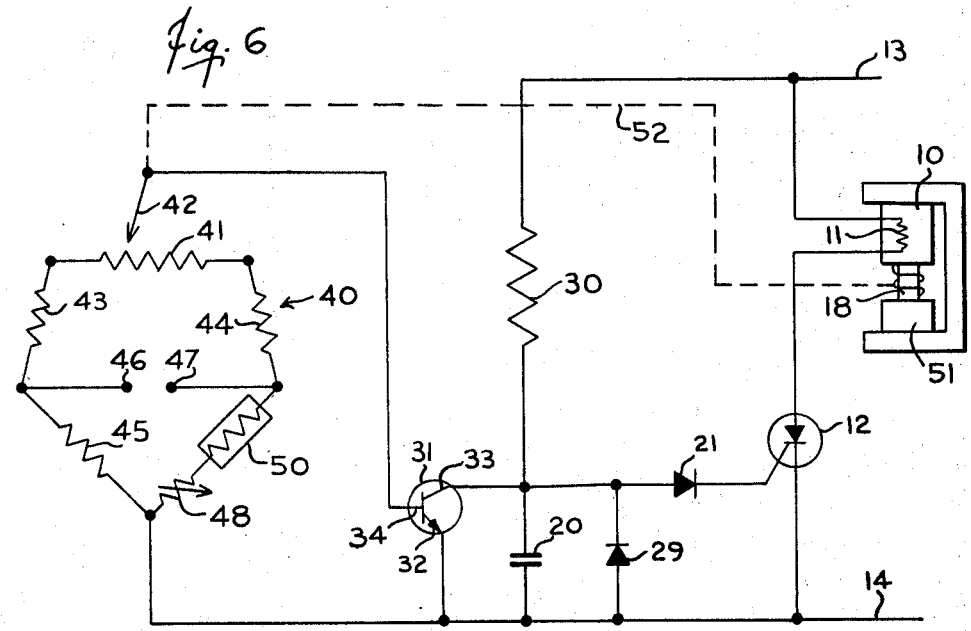
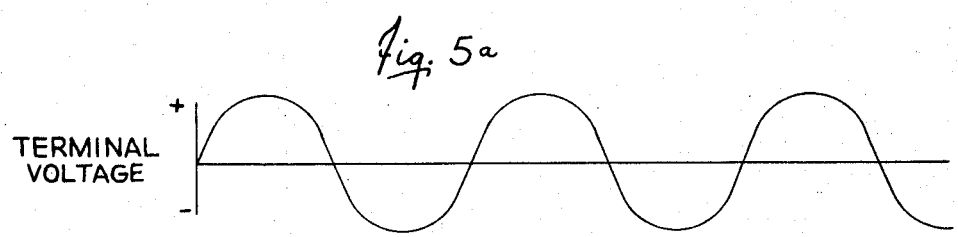
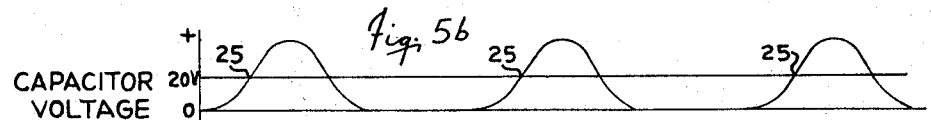
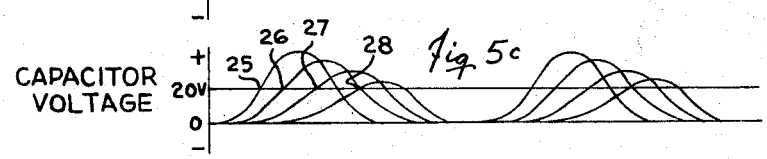
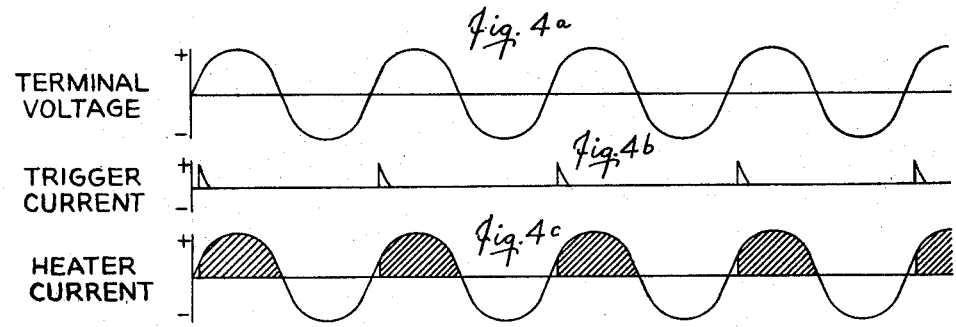

United States Patent Office 3,389,314
Patented June 18, 1968

3,389,314
PROPORTIONAL SILICON CONTROLLED RECTIFIER DRIVEN SYSTEM FOR A HEAT MOTOR
Dwight C. Lewis, Goshen, Ind., assignor to Penn Controls, Inc., a corporation of Indiana
Filed May 7, 1962, Ser. No. 192,765
23 Claims. (Cl. 318—117)

The present invention relates to a proportional heat motor actuator and in particular to a heat motor actuator which is particularly adaptable for use in a feedback control system.

The demand for feedback control systems in the heating field which can be manufactured at economical cost has been steadily increasing. At the present time, electrical motors and a gear train are the most commonly used device to operate a mechanical control such as a valve or a damper in a heating system. Therefore, such an electrical motor and a required gear train usually represent a substantial cost of the total cost of a feedback control system used to control a heating system. For some time, it has been known that heat motors are more economical to manufacture than electric motors with gear trains capable of performing an equivalent operation. However, heat motors have not been utilized for such a purpose because adequate heat motor actuators have not been generally available and those that have been available have not been particularly suitable for use in a feedback control system. The present invention not only provides a successful and economical heat motor actuator, but also provides a heat motor actuator which is readily incorporated as part of a feedback control system.

It is, therefore, an object of the present invention to provide a new and improved proportional heat motor actuator.

Another object is to provide a proportional heat motor actuator comprising a silicon-controlled rectifier and a trigger circuit therefor.

A further object is to provide a trigger circuit for a silicon-controlled rectifier which includes a variable voltage divider feeding a capacitance voltage sensitive rectifier circuit wherein a trigger pulse is produced at a phase angle proportional to a voltage supplied by the voltage divider.

A principal object of the present invention is to provide a feedback control system which incorporates a heat motor controlled by a silicon-controlled rectifier and a trigger circuit therefor.

Further objects and advantages will become apparent from the following detailed description taken in connection with the accompanying drawings, in which:

FIGS. 2, 3, 4 and 5 are graphs of voltages and currents appearing in the embodiment of the invention shown in FIG. 1 under various conditions of operation; and FIG. 6 is a schematic diagram of another embodiment of the present invention.

Figure 1:
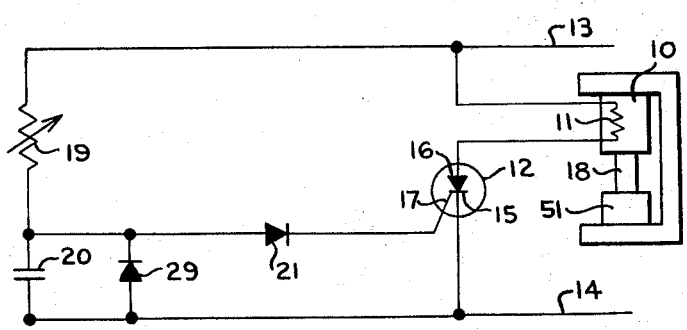
FIG. 1 is a schematic diagram of an embodiment of the present invention.

While this invention is susceptible of embodiment in many different forms, there are shown in the drawings and will herein be described in detail embodiments of the invention with the understanding that the present disclosure is to be considered as an exemplification of the principles of the invention and it is not intended to limit the invention to the embodiments illustrated. The scope of the invention will be pointed out in the appended claims.

Referring first to FIG. 1, a heat motor generally indicated as 10 has an electrical heater 11 connected in series with a silicon-controlled rectifier 12 between terminals 13 and 14 which are adapted to be connected across a source of alternating electrical current. The silicon-controlled rectifier has a cathode 15, an anode 16, and a control element or gate 17. The silicon-controlled rectifier is analogous to a gas thyratron in that it is a rectifier which may be switched on and off. The silicon-controlled rectifier may be switched on by applying a trigger or firing pulse across the gate 17 and the cathode 15 while there is a positive-to-negative voltage applied between the anode 16 and the cathode 15. Once the silicon-controlled rectifier 12 is switched on by a trigger pulse, it will continue to conduct until the voltage between the anode and the cathode drops to zero.

Figure 2A:
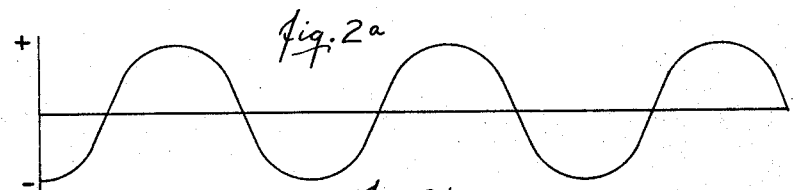

FIG. 2a shows the alternating current voltage applied across the terminals 13 and 14 and available to heat the electrical heater 11 by dissipating energy therein. However, the silicon-controlled rectifier 12, having its anode connected to the terminal 13 through the heater 11 and its cathode connected to the terminal 14, rectifies the alternating current so that only the positive half cycles are available to produce a voltage across the heater 11. In addition, current will not be passed through the heater 11 during a positive cycle until the control element has had a trigger pulse applied thereto which allows the silicon-controlled rectifier to pass current until the voltage between its anode and cathode returns to zero.

Figure 2B:
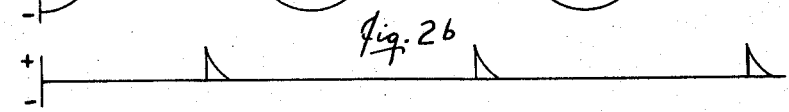
Figure 2C:
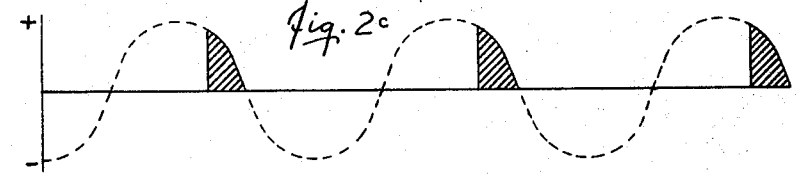
Figure 3A:
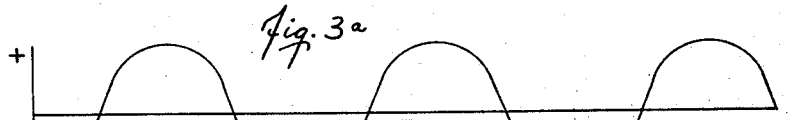
Figure 3B:
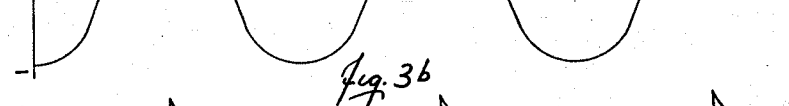
Figure 3C:
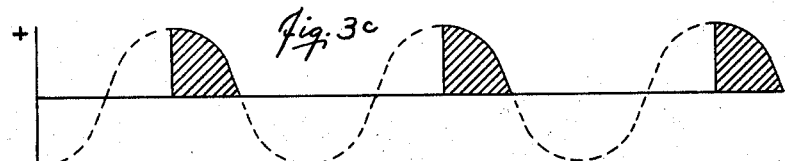

FIG. 2b shows a series of trigger current pulses which are applied to the gate 17 which in turn produces the current wave form as shown in FIG. 2c through the heater 11. If a current pulse as indicated in FIG. 3b is applied across the control element and cathode of a silicon-controlled rectifier at the peak of the positive half cycle voltage, half of the total possible current wave form is available as the current wave form (as shown in FIG. 3c) to heat the heater 11.

FIG. 4b shows a series of trigger current pulses which are timed to occur almost at the beginning of the positive half cycles as applied across the terminals 13 and 14 and indicated in FIG. 4a. Applying these pulses to gate 17 results in the silicon-controlled rectifier 12 passing current during almost all of the positive half cycle as illustrated by FIG. 4c. Thus, it may be seen that the time or phase angle of occurrence of the leading edge of a current pulse between the gate 17 and the cathode 15 of the silicon-controlled rectifier 12 in relation to the positive half cycles of the alternating current across the terminals 13 and 14 is proportional to the amount of electrical power being dissipated in the heater 11 and, thus, proportional to the amount of heat being received by the heat motor. The shaded areas in FIGS. 2c, 3c and 4c under the current curve are proportional in area to the electrical power dissipated in the heater 11. Thus, as the phase angle of the trigger current pulse is moved forward in time relative to the alternating current positive half cycle, the temperature of the heat motor is increased and an output actuator 18 is moved further toward an advanced position.

Having described the proportionality between the timing of a trigger pulse and the positive half cycle of the alternating current, a trigger circuit for producing such a trigger pulse will now be described in detail. Referring again to FIG. 1, a variable resistance 19 is connected in series with a condenser 20 between the terminals 13 and 14. During a positive half cycle of the alternating current, the voltage across the condenser 20 will increase exponentially until the voltage across a voltage sensitive rectifier 21, the control element 17 and the cathode 15 exceeds the voltage sensitivity level of the rectifier 21 and it begins to pass a current trigger pulse as illustrated in FIGS. 2b, 3b and 4b. The voltage sensitive rectifier may be of any form commonly used in the art. A preferred form is a rectifier having a barrier which when pulsed experiences avalanche breakdown. Assuming for the moment that the barrier breakdown of the rectifier 21 is a positive 20 volts, a trigger pulse is applied to the control element 17 whenever the voltage across the condenser 20 arrives at 20 volts.

Referring to FIG. 5a, which illustrates an alternating current voltage applied across the terminals 13 and 14 and to FIG. 5b, which shows a typical voltage rise across the condenser 20, it is seen that the trigger point 25 is the voltage at which the rectifier 21 breaks down and commences conducting current to produce the trigger pulse which places the silicon-controlled rectifier 12 in a conductive mode. If the variable resistor 19 is varied to change the time constant of the RC circuit composed of resistor 19 and condenser 20, a set of voltage wave forms may be produced as shown in FIG. 5c which have the respective trigger points of 25, 26, 27 and 28. Thus, as the total resistance of the variable resistor 19 is increased, the trigger point of 20 volts is reached later during the positive half cycle of the alternating voltage and the trigger phase angle is increased.

A diode 29 is connected in parallel with the condenser 20 to pass current around the condenser during the negative half cycle of the alternating current.

Referring now to FIG. 6, the heat motor 10 and the heat motor actuator shown in FIG. 1 are incorporated into a feedback control system. In order to provide for the varying of control voltages to condenser 20, the variable resistor 19 has been replaced with a fixed resistor 30 and a transistor 31 having an emitter 32, a collector 33, and a base 34 has been connected in series with it between the terminals 13 and 14. The resistance between the collector 33 and the emitter 32 is a function of a base to emitter current between the base 34 and the emitter 32. Therefore, varying the base to emitter current will change the time necessary to charge the condenser 20 to the 20 volts that is required before the voltage sensitive rectifier 21 will commence to conduct and provide a trigger pulse to the silicon-controlled rectifier 12. The base 34 and the emitter 32 are connected across a Wheatstone bridge generally indicated at 40 which consists of a variable resistor 41 having a wiper arm 42, fixed resistors 43, 44, and 45, terminals 46 and 47 which are adaptable to be connected across the source of alternating electrical current, a manually controlled variable resistance 48 and a thermistor 50. The variable resistance 41 has its wiper arm 42 connected to the base 34 so that movement of the wiper arm 42 will vary the proportional amount of resistance found in the two top arms of the Wheatstone bridge. The resistor 45 provides the fixed resistance in one of the lower arms of the bridge. The thermistor 50 and the variable resistance 48 are positioned in the other lower arm of the bridge so that their total resistance will indicate both a desired temperature in an enclosed space by the manual setting of the variable resistance 48 and the present temperature of that enclosed space by the resistance produced by the temperature sensitive thermistor 50.

The heat motor output actuator 18 is connected to a control 51 such as a valve or damper which controls the output of a furnace. A mechanical linkage 52 connects the output actuator 18 to the wiper arm 42 in order to provide a mechanical feedback path to the variable resistance 41 in the Wheatstone bridge.

If the combined resistance of the variable resistance 48 and the thermistor 50 indicates that the enclosed space temperature is different from the desired temperature as manually set on the variable resistance 48 and the furnace is not providing sufficient heat in proportion to the enclosed space temperature differential from the desired temperature, the Wheatstone bridge will provide a current through the base 34 and the emitter 32 which is proportional to the error of the heat motor actuator 18 from the position it should assume for the temperature differential as indicated by the combined resistance of a variable resistance 48 and the thermistor 50. In this manner, the Wheatstone bridge varies the charging rate of the condenser 20 which is fed from the voltage divider composed of the resistor 30 and transistor 31. The magnitude of the current provided by the Wheatstone bridge thus controls, through the trigger phase angle, the amount of heat which is provided per unit time by the heater 11. The amount of heat produced by the heater 11 determines the position of the actuator 18 of the heat motor 10 which in turn positions the wiper arm 42 to provide a feedback between the actuator and Wheatstone bridge. As the enclosure temperature approaches the desired temperature set on the variable resistance 48, the Wheatstone bridge will vary the base to emitter current through the transistor 31. The actuator 18 positions the control 51 to reduce the amount of heat to the enclosed space in proportion to the decreasing temperature differential until the desired temperature is achieved in the enclosed space. When the desired temperature has been achieved in the enclosed space, the current provided by the Wheatstone bridge to the transistor 31 is either zero or slightly reversed. This input to the transistor prevents the voltage sensitive rectifier 21 from conducting, thus turning off power to the heat motor and stopping its actuator at a position proportional to the temperature between the desired and present temperature from an enclosure.

Whenever there is a negative temperature error, the silicon-controlled rectifier is merely prevented from firing and the heat motor is allowed to cool by convection. Such cooling will continue until the wiper arm 42 is moved to a position where a negative voltage is supplied to the transistor allowing the silicon-controlled rectifier to fire. Alternate heating and cooling will maintain such a position over a small travel of the output actuator 18.

I claim:
1. The combination comprising:
   a heat motor having an expandable chamber containing a fluid, an electrical resistance heater and an output actuator,
   a silicon-controlled rectifier having an anode, a cathode and a control element, said heater, said anode, and said cathode adapted to be connected in series across a source of alternating current, and
   means for applying a trigger pulse across said control element and said cathode.

2. The combination comprising:
   a heat motor having an expandable chamber containing a fluid and an electrical resistance heater,
   a silicon-controlled rectifier having an anode, a cathode and a control element, said heater, said anode and said cathode adapted to be connected in series across a source of alternating current,
   a means for applying a trigger pulse across said control element and said cathode when said alternating current is at a predetermined phase angle, and
   a means for varying the occurence of the trigger pulse to correspond to various phase angles of said alternating current.

3. The combination comprising:
   a heat motor having an expandable chamber containing a fluid, an electrical resistance heater and an output actuator,
   a silicon-controlled rectifier having an anode, a cathode and a control element, said heater, said anode, and said cathode adapted to be connected in series across a source of alternating current,
   a condenser adapter to be connected across the source of alternating current and in series between said control element and said cathode,
   a diode connected in parallel with said condenser,
   a voltage sensitive rectifier connected in series between said control element and said condenser, and
   means for varying the charging rate of said condenser.

4. The combination comprising:
   a heat motor having an expandable chamber containing a fluid, an electrical resistance heater and an output actuator,
   a silicon-controlled rectifier having an anode, a cathode and a control element, said heater, said anode, and said cathode adapted to be connected in series across a source of alternating current,
a voltage sensitive rectifier,
a variable voltage divider adapted to be connected across the source of alternating current,
a condenser connected in series with said rectifier between said control element and said cathode and connected across a portion of said variable voltage divider,
a diode connected in parallel with said condenser,
a means for producing an error signal having a variable magnitude connected to said heat motor actuator, and
a means for varying the voltage provided to said condenser from said divider in proportion to the magnitude of said error signal connected between said means for producing an error signal and to said voltage divider.

5. The combination comprising:
a heat motor having an expandable chamber containing a fluid, an electrical resistance heater and an output actuator,
a silicon-controlled rectifier having an anode, a cathode and a control element, said heater, said anode, and said cathode adapted to be connected in series across a source of alternating current,
a means for applying a trigger pulse across said control element and said cathode when said alternating current is at a predetermined phase angle,
means for producing an error signal having a variable magnitude connected to said heat motor actuator, and
a means for varying the occurence of the trigger pulse to correspond to various phase angles of said alternating current.

6. The combination comprising:
a heat motor having an expandable chamber containing a fluid, an electrical resistance heater and an output actuator,
a silicon-controlled rectifier having an anode, a cathode and a control element, said heater, said anode, and said cathode adapted to be connected in series across a source of alternating current,
a resistance,
a condenser adapted to be connected in series with said resistance across the source of alternating current,
a variable resistance connected across said condenser,
a diode connected in parallel with said condenser, and
a voltage sensitive rectifier connected between said control element, said condenser, and said resistance.

7. The combination comprising:
a heat motor having an expandable chamber containing a fluid, an electrical resistance heater and an output actuator,
a silicon-controlled rectifier having an anode, a cathode and a control element, said heater, said anode, and said cathode adapted to be connected in series across a source of alternating current,
a variable resistance,
a condenser adapted to be connected in series with said resistance across the source of alternating current,
a diode connected in parallel with said condenser, and
a voltage sensitive rectifier connected between said control element, said condenser, and said resistance.

8. The combination comprising:
a heat motor having an expandable chamber containing a fluid, an electrical resistance heater and an output actuator,
a silicon-controlled rectifier having an anode, a cathode and a control element, said heater, said anode, and said cathode adapted to be connected in series across a source of alternating current,
a resistance,
a condenser adapted to be connected in series with said resistance across the source of alternating current,
a transistor having an emitter, a collector and a base, said emitter and said collector being connected in series across said condenser,
a diode connected in parallel with said condenser,
a voltage sensitive rectifier connected between said control element and said condenser, resistance, and collector of said transistor,
a Wheatstone bridge adapted to be connected to said source of alternating current, connected between the base and emitter of said transistor, and having a thermistor sensor and two variable resistances, and
a mechanical linkage connected between said heat motor actuator and one of said variable resistances.

9. In a circuit for supplying direct current power to a load from an alternating current power source in response to a registered command signal:
(a) a semiconductor controlled rectifier having an anode, a cathode, and a gate,
(b) means connecting said load in the anode-cathode circuit of said controlled rectifier and in series with said alternating current power source,
(c) a capacitor having two terminals, one of which is connected to said cathode,
(d) a charging circuit for said capacitor,
(e) avalanching means electrically connecting the other of said capacitor terminals to said gate of said controlled rectifier, said avalanching means having a breakdown voltage selected to cause application of a firing pulse from said capacitor to said gate under conditions where said capacitor charges to said breakdown voltage, and
(f) a variable electrical impedance connected across said capacitor for controlling charging of said capacitor and, in turn, firing of said controlled rectifier.

10. In a circuit as set forth in claim 9 wherein there is provided means responsive to a predetermined relationship between said command signal and the condition of said load for selectively varying said electrical impedance to control said firing and, thus the power supplied to said load.

11. In a circuit for supplying direct current power to a load from an alternating current power source:
(a) a semiconductor controlled rectifier having an anode, a cathode, and a gate,
(b) means connecting said load in the anode-cathode circuit of said controlled rectifier and in series with said alternating current power source,
(c) a capacitor having two terminals, one of which is connected to said cathode,
(d) a charging circuit for said capacitor,
(e) avalanching means electrically connecting the other of said capacitor terminals to said gate of said controlled rectifier, said avalanching means having a breakdown voltage selected to cause application of a firing pulse from said capacitor to said gate under conditions where said capacitor charges to said breakdown voltage, and
(f) means for applying a variable electrical impedance across said capacitor for controlling charging of said capacitor and, in turn, firing of said rectifier.

12. In the device set forth in claim 11 wherein the load is an electrical conductor of selected electro-thermal characteristics.

13. In the device set forth in claim 12 wherein said conductor is in the form of an energizing coil.

14. In a circuit for supplying direct current power to a load from an alternating current power source:
(a) a semiconductor controlled rectifier having an anode, a cathode, and a gate,
(b) means connecting said load in the anode-cathode circuit of said controlled rectifier and in series with said alternating current power source,
(c) a resistor and a capacitor connected in series circuit with each other and across the anode-cathode circuit of said controlled rectifier,
(d) avalanching means electrically connecting the junction of said resistor and capacitor to said gate of said controlled rectifier, said avalanching means having a breakdown voltage predetermined to apply a firing pulse to said controlled rectifier, and
(e) electrical component means in shunting circuit relation to said capacitor and selectively operative for limiting charging of said capacitor.

15. In a circuit for supplying direct current power to a load from an alternating current power source:
(a) a semiconductor controlled rectifier having an anode, a cathode, and a gate,
(b) means connecting said load in the anode-cathode circuit of said controlled rectifier and in series with said alternating current power source,
(c) a resistor and a capacitor connected in series circuit with each other and across the anode-cathode circuit of the said controlled rectifier,
(d) avalanching means electrically connecting the junction of said resistor and capacitor to said gate of said controlled rectifier, said avalanching means having a breakdown voltage predetermined to cause said capacitor to apply a firing pulse to said controlled rectifier via said gate, and
(e) means selectively operative for applying an electrical shunting path across said capacitor effective to limit charging of said capacitor to below said breakdown voltage to control application of said firing pulse.

16. In a circuit for supplying direct current power to a load from an alternating current power source:
(a) a semiconductor controlled rectifier having an anode, a cathode, and a gate,
(b) means connecting said load in the anode-cathode circuit of said controlled rectifier and in series with said alternating current power source,
(c) a resistor and a capacitor connected in series in the named order across said anode-cathode circuit of said controlled rectifier,
(d) a trigger diode connecting a point intermediate said resistor and capacitor to said gate of said controlled rectifier, said diode having a breakdown voltage predetermined to cause application of a firing pulse to said rectifier under conditions where said capacitor charges to a certain level, and
(e) means selectively actuatable for placing an electrical shunt across said capacitor for controlling the charging and discharging thereof to and from said certain level, respectively and, in turn, said firing of said rectifier.

17. In the device set forth in claim 16 wherein the load is an electrical conductor having predetermined electromechanical characteristics.

18. In the device set forth in claim 17 wherein the electrical conductor is constructed as a heater coil.

19. In a circuit for supplying direct current power to a load from an alternating current power source:
(a) a semiconductor controlled rectifier having an anode, a cathode, and a gate,
(b) means connnecting said load in the anode-cathode circuit of said controlled rectifier and in series with said alternating current power source,
(c) a resistor and a capacitor connected in series in the named order across said anode-cathode circuit of said controlled rectifier,
(d) a trigger diode connecting a point intermediate said resistor and capacitor to said gate of said controlled rectifier, said diode having a breakdown voltage predetermined to cause application of a firing pulse to said rectifier under conditions where said capacitor charges to a certain level,
(e) means selectively actuatable for placing an electrical shunt across said capacitor for controlling the charging and discharging thereof to and from said certain level, respectively, and, in turn, said firing of said rectifier, and
(f) means responsive to power supplied to said load for actuating said capacitor shunting means into shunting condition, under conditions where said supplied power attains at least a certain amount.

20. In a circuit for supplying direct current power to a load from an alternating current power source in response to a demand signal:
(a) a semiconductor controlled rectifier having an anode, a cathode, and a gate,
(b) means connecting said load in the anode-cathode circuit of said controlled rectifier and in series with said alternating current power source,
(c) a capacitor having two terminals, one of which is connected to said cathode,
(d) a charging circuit for said capacitor,
(e) avalanching means electrically connecting the other of said capacitor terminals to said gate of said controlled rectifier, said avalanching means having a breakdown voltage selected to cause application of a firing pulse from said capacitor to said gate under conditions where said capacitor charges to said breakdown voltage, and
(f) electric circuit means connected across said capacitor for controlling charging of said capacitor and, in turn, firing of said rectifier, said circuit means having an impedance operatively responsive in magnitude to variations in a certain characteristic of said demand signal.

21. In a circuit for supplying direct current power to a load from an alternating current power source:
(a) a semiconductor controlled rectifier having an anode, a cathode, and a gate,
(b) means connecting said load in the anode-cathode circuit of said controlled rectifier and in series with said alternating current power source,
(c) a capacitor having two terminals, one of which is connected to said cathode,
(d) a charging circuit for said capacitor,
(e) avalanching means electrically connecting the other of said capacitor terminals to said gate of said controlled rectifier, said avalanching means having a breakdown voltage selected to cause application of a firing pulse from said capacitor to said gate under conditions where said capacitor charges to said breakdown voltage, and
(f) a transistor having its collector-emitter path shunting said capacitor to control the charging of said capacitor in accordance with conduction of said transistor through said shunting path to control application of said firing pulse.

22. In a circuit as set forth in claim 21 wherein there is provided means responsive to a predetermined condition of said load for controlling said conduction of said transistor.

23. In a circuit as set forth in claim 22 wherein said conduction control means comprises, biasing means responsive to the power supplied to said load for controlling the bias of said transistor effective to render said transistor conductive when said power supplied exceeds a preselected magnitude.

References Cited
UNITED STATES PATENTS

| | | | |
|---|---|---|---|
| 2,558,708 | 6/1951 | Macgeorge | 236—68 |
| 2,690,647 | 10/1954 | Woodward | 60—39.28 |
| 2,926,293 | 2/1960 | Camm | 318—117 |
| 3,050,611 | 8/1962 | Kamide | 307—88.5 |
| 3,062,941 | 11/1962 | White. | |

MILTON O. HIRSHFIELD, *Primary Examiner.*

DAVID X. SLINEY, *Examiner.*